US005229709A

United States Patent [19]

Pfennings, deceased

[11] Patent Number: 5,229,709

[45] Date of Patent: Jul. 20, 1993

[54] INTEGRATED CIRCUIT WITH TEMPERATURE COMPENSATION

[75] Inventor: Leonardus C. M. G. Pfennings, deceased, late of Sittard, Netherlands, by Henricus J. Kunnen

[73] Assignee: U.S. Philips Corp., New York, N.Y.

[21] Appl. No.: 971,708

[22] Filed: Nov. 4, 1992

Related U.S. Application Data

[63] Continuation of Ser. No. 906,014, Jun. 26, 1992, abandoned, which is a continuation of Ser. No. 721,048, Jun. 26, 1991, abandoned.

[30] Foreign Application Priority Data

Jun. 29, 1990 [NL] Netherlands ........................ 9001493

[51] Int. Cl.[5] ........................ G05F 1/56; H02M 3/156

[52] U.S. Cl. ................................ 323/2.82; 307/296.6; 323/907

[58] Field of Search ............... 323/281, 282, 284, 265, 323/279, 349, 316, 907; 307/296.6, 296.8, 246, 475

[56] References Cited

U.S. PATENT DOCUMENTS

| | | | |
|---|---|---|---|
| 3,908,136 | 9/1975 | Desperques-Volmier | 307/573 |
| 4,298,835 | 11/1981 | Rowe | 323/281 |
| 4,479,052 | 10/1984 | Suzuki | 307/296.6 |
| 4,683,382 | 7/1987 | Sakurai | 307/296.3 |
| 4,723,108 | 2/1988 | Murphy | 323/315 |
| 5,023,543 | 6/1991 | Tse | 323/314 |

FOREIGN PATENT DOCUMENTS 0296681 12/1988 European Pat. Off. .

OTHER PUBLICATIONS

"A new CMOS current reference", Sansen et al., pp. 125-128 1987 Digest of the ESSCIR C.

"Hot-carrier and wear-out phenomena is Submicron VLSI's" Eigi Takeda, Nov. 1985, Central Research Laboratory, Hitachi Ltd.

*Primary Examiner*—Steven L. Stephan
*Assistant Examiner*—Adolf Berhane
*Attorney, Agent, or Firm*—Steven R. Biren

[57] ABSTRACT

An integrated circuit has an internal supply voltage with a positive temperature coefficient, as a result of which the switching rate and the degree of "hot carrier stress" are less sensitive to temperature. By using a reference voltage source having positive temperature coefficient, the normal effects of increasing temperature on switching rate and "hot carrier stress" are compensated for, thus stabilizing circuit operation as a function of temperature. The reference voltage source is incorporated within a voltage converter which is already present in the circuit, to achieve a compact and efficient configuration.

4 Claims, 1 Drawing Sheet

INTEGRATED CIRCUIT WITH TEMPERATURE COMPENSATION

This is a continuation of application Ser. No. 07/906,014, filed Jun. 26, 1992 which is continuation of Ser. No. 07/721,048 filed Jun. 26, 1991 now abandoned.

BACKGROUND OF THE INVENTION

The invention relates to a circuit having an external supply voltage junction point and an internal supply voltage junction point and a voltage converter arranged between said junction points, for connecting to the internal supply voltage junction point an internal supply voltage which is lower than the supply voltage across the external junction point.

Such a circuit is disclosed in the Netherlands patent application 8701472. Since the dimensions of transistors and other components of an integrated circuit are getting increasingly smaller, the distances across which voltages of the order of the supply voltage also become increasingly smaller. This results in high electric field strengths which produce inter alia what is commonly denoted "hot carrier stress" in, for example, field effect transistors. For reasons of reliability it is therefore necessary to use a supply voltage lower than the standard 5V supply voltage for MOS components having, for example, channel lengths less than 1 μm (so-called submicron components). The prior art integrated circuit has an external (5 V) and an internal supply voltage junction point, between which a voltage converter is arranged which repeatedly charges a parasitic capacitance which is connected in parallel with the internal supply voltage junction point. This capacitance is used as a current supply for the integrated circuit. The voltage converter includes a detector circuit which, in dependence on the voltage across the internal supply voltage junction point and with a certain hysteresis switches an electronic switch which is arranged between the internal and the external supply voltage junction point. This known integrated circuit has the drawback that the switching rate of the circuit and the problem of hot carrier stress vary greatly with temperature.

SUMMARY OF THE INVENTION

The invention has inter alia for its object to provide an integrated circuit whose mode of operation (the switching rate and the sensitivity to hot carrier stress in particular) is temperature-dependent to a lesser extent. To that end, an integrated circuit in accordance with the invention is characterized in that the voltage converter is arranged for generating an internal supply voltage having a positive temperature coefficient. Fundamentally, the invention is based on the recognition that the switching rate of a circuit and also the hot carrier stress decrease versus an increasing temperature, while the switching rate of a circuit and also the hot carrier stress increases versus an increasing internal supply voltage. An integrated circuit according to the invention, in which at an increasing temperature the internal supply voltage also increases, consequently provides, at temperature changes, a substantially constant switching rate and a substantially constant hot carrier stress. The above-mentioned effects then substantially cancel each other, while they actually intensify each other at a negative temperature coefficient. A temperature coefficient having a value between +1.5 mV/K and +6 mV/K prones to be advantageous.

BRIEF DESCRIPTION OF THE DRAWING

The invention will now be described in greater detail with reference to the accompanying Figures, in which.

DESCRIPTION OF THE PREFERRED EMBODIMENTS

Before the invention will be described with reference to the Figures, the problem which the invention solnes will first be described. For reasons of reliability it is necessary to use a supply voltage (for example 3.3 V) which is lower than the standard supply voltage (of 5 V) for MOS components having channel lengths less than, for example, 1 μm. More specifically in large static random access memories from 256 kbits upwards, in which memory cells formed by six CMOS-transistors arranged in a memory matrix and having a channel length of not more than 0.7 μm are used, a co-integrated supply voltage reduction is required. Other circuit or technical solutions are not used, as then the cell surface area would become too large.

Figure 1:
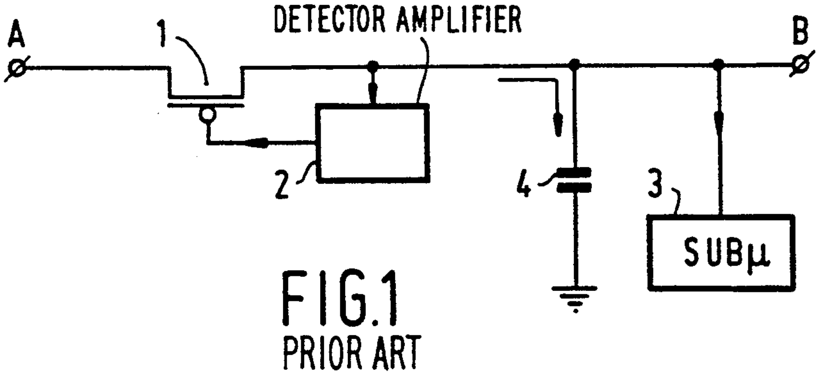
FIG.1 PRIOR ART
FIG. 1 shows a prior art integrated circuit.

In FIG. 1, A denotes the external supply voltage junction point (carrying a voltage VD of, for example, 5 V) and B denotes the internal supply voltage junction point (carrying a voltage VI of , for example, 3.3 V). Interposed between them is a voltage converter, comprised of an electronic switch, in this case a PMOS-power switching transistor 1, and a detector circuit, more specifically a detector amplifier 2, which has its detection input connected to the internal supply voltage junction point B and its output to the control input of the electronic switch, in FIG. 1 the control electrode of transistor 1. The integrated (parasitic) circuit capacitance 4, which may for example have a value of 3 nF in the case of a 256 kbits SRAM, is repeatedly recharged via transistor 1, more specifically when the detector 2 detects that voltage VI across internal supply voltage junction point B has decreased to below a predetermined threshold value. Then transistor 1 is turned on and capacitance 4 is recharged until detector 2 detects that voltage VI has increased to above a further threshold value. The difference in these threshold values corresponds to the hysteresis of detector 2. In this manner the inevitable parasitic capacitance 4 is used to supply submicron components 3 with current.

When MOS-transistors having small channel lengths (in the submicron range) or small oxide thicknesses are used in integrated circuits, there is a risk of "hot carrier stress" occurring. Namely, when the channel length of transistors decreases, the maximum permitted voltage difference over the drain-source path gets smaller. A decrease in the supply voltage (of, for example, 5 V to 3.3 V), reduces the sensitive to hot carrier stress, but also leads to circuits with a lower operating rate.

Generally, it is desirable to have an internal supply voltage available which is as constant as possible and more specifically, is independent of temperature. At an increasing temperature the rate at which a circuit operates generally decreases, as do also the negative effects of hot carrier stress (see the article "Hot-carrier and wear-out phenomena in submicron VSLI's" by E. Takeda, Processing VSLI-Symposium 1985, pages 2–5). When the internal voltage increases, then however the rate o a circuit increases, and also the hot carrier stress. If now an internal supply voltage is used having a temperature coefficient around zero or negative, then the influence of the temperature on the operating rate and the sensitivity to hot carrier stress of a circuit is not compensated for, and is even intensified for the case of a negative temperature coefficient.

The voltage converter, which is described in the Netherlands patent application 8701472, has an internal supply voltage which depends on several times the threshold voltage of the transistors plus the voltage swing. The threshold voltages decrease with increasing temperature, and this provides a negative temperature coefficient for the internal supply voltage. A circuit fed via this voltage converter is therefore very sensitive to temperature as regards its operating rate and hot carrier stress.

Figure 2A:
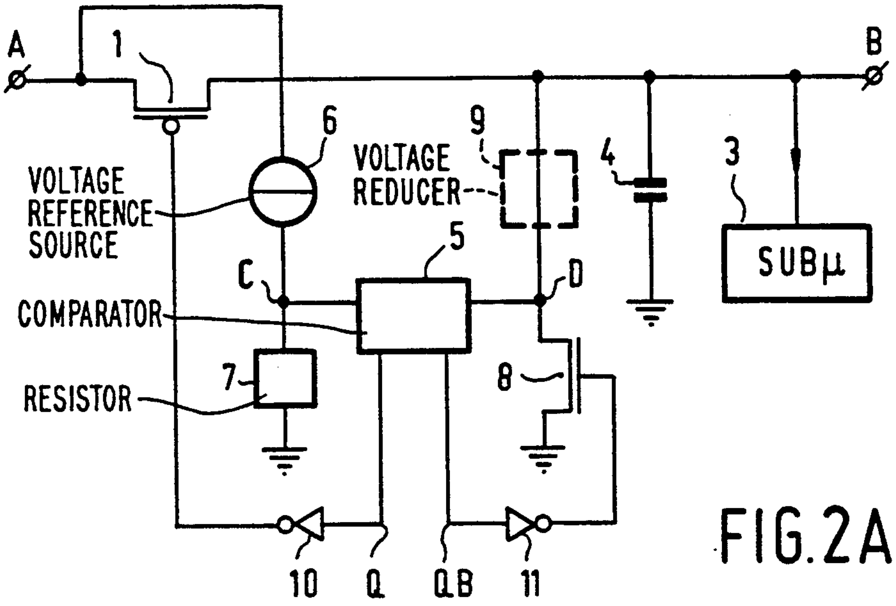
FIG. 2A and 2B shows an integrated circuit of the invention.
Figure 2B:
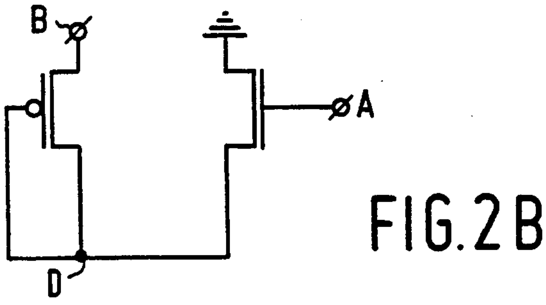

FIG. 2 shows an integrated circuit in accordance with the invention. The same reference symbols are used to denote the same components shown in FIG. 1. FIG. 2A illustrates a reference voltage source 6, connected to the external supply voltage, which produces a constant current and is connected to ground via resistor 7. The current source is connected via junction point C to an input of a comparator circuit 5 which is known per se and whose other input is connected to junction point D which optionally is connected to junction point B via a voltage reducer 9. One (non-inverting) output Q of the comparator circuit 5 is connected via an inverting element 10, for example a standard CMOS inverter, to the control electrode of switch 1, the other (inverting) input QB is fed back to junction point D via a further inverting element 11 and hysteresis transistor 8. A differential amplifier, or, for example, an n-channel amplifier stage arranged in series with a p-channel amplifier stage can be used as the comparator circuit 5. Resistor 7 can be realized by arranging, for example, three n-channel MOS-transistors in series, their gates being connected to junction point C to which also the drain of the fist transistor is connected, the source of the third transistor being connected to ground. Current source 6 is based on a PTAT (Proportional To Absolute Temperature) voltage source, as described in, for example, the article "A new CMOS current reference" by W. Sansen, F. op 't Eynde and M. Steyaert, Digest of the ESSCIRC 1987, pages 125–128. By using such a current source, which is known per se, a reference voltage VR having a positive temperature coefficient of, for example, 4.5 mV/K is generated at junction point C. The value of the reference voltage VR across junction point C is preferable chosen to be one threshold voltage lower than internal supply voltage VI, to have current source 6 and comparator circuit 5 function in their optimum working range. To that end also the voltage across junction point D is reduced by one threshold voltage relative to VI, using voltage reducer 9. The latter may, for example, as shown in FIG. 2B, be in the form of a p-channel MOS-transistor, whose source is connected to junction point B and whose gate and drain are interconnected, this drain being connected to th drain of an n-channel MOS-transistor, whose gate is connected to the external supply voltage and whose source is connected to ground. The reference voltage VR with positive temperature coefficient is applied to the comparator circuit 5, which now, by feedback to junction point D, induces a voltage which also has a positive temperature coefficient, so that also the internal supply voltage VI across junction point B gets a positive temperature coefficient of, for example, 3.2 mV/K, with all the advantages mentioned above.

What is claimed is:

1. A circuit, having an external supply voltage junction point, an internal supply voltage junction point and a voltage converter connected between said junction points for connecting to the internal supply voltage junction point an internal supply voltage which is lower than the supply voltage across the external junction point, characterized in that the voltage converter comprises means for stabilizing hot carrier stress and switching rate in other portions of said circuit by generating an internal supply voltage having a positive temperature coefficient coupled to said external supply voltage junction, said means comprising means for generating a reference voltage having a positive temperature coefficient.

2. A circuit as claimed in claim 1, characterized in that the voltage converter includes an electronic switch connected between the said junction points for periodically charging a circuit capacitance connected to the internal supply voltage junction point, said means for generating a reference voltage having a positive temperature coefficient being connected to said external supply voltage junction, and a detector circuit for switching the switch on or off in dependence on the internal supply voltage and the reference voltage, said detector circuit having an input coupled to said internal supply voltage junction and an output coupled to a control electrode of said electronic switch.

3. A circuit as claimed in claim 2, characterized in that the means for generating a reference voltage comprises a reference current source, in which a PTAT voltage source is employed.

4. A circuit as claimed in claim 1, characterized in that the value of the temperature coefficient of the internal supply voltage is between +1.5 mV/K and +6 mV/K.

* * * * *